United States Patent [19]

Frost, III

[11] Patent Number: 4,525,278
[45] Date of Patent: Jun. 25, 1985

[54] METHOD OF TREATING CHEMICAL PROCESS WATER

[75] Inventor: Arthur W. Frost, III, Park Ridge, N.J.

[73] Assignee: Federal Paper Board Company, Inc., Montvale, N.J.

[21] Appl. No.: 185,485

[22] Filed: Sep. 9, 1980

Related U.S. Application Data

[63] Continuation-in-part of Ser. No. 13,088, Feb. 21, 1979, Pat. No. 4,221,634.

[51] Int. Cl.³ ............................ C02F 1/44; C02F 1/32
[52] U.S. Cl. .................................. 210/638; 210/650; 210/651; 210/702; 210/713; 210/748; 210/805; 162/29; 162/190; 204/157.1 R
[58] Field of Search ............... 210/609, 638, 650, 651, 210/748, 702, 712, 713, 805; 162/29, 190; 204/159.12, 160.1, 158 R, 157.1 R, 157.1 P; 422/24

[56] References Cited

U.S. PATENT DOCUMENTS

| | | | |
|---|---|---|---|
| 2,240,403 | 4/1941 | Karlstrom | 210/723 |
| 3,069,226 | 12/1962 | Boucher | 210/748 |
| 3,511,776 | 5/1970 | Avampato | 210/748 |
| 3,561,933 | 2/1971 | Restaino | 204/159.12 |
| 3,677,935 | 7/1972 | Spragg | 210/609 |
| 3,766,060 | 10/1973 | Smith | 210/748 |
| 3,821,073 | 6/1974 | Eriksson | 162/190 |
| 3,901,806 | 8/1975 | Murchison | 210/748 |
| 4,009,073 | 2/1977 | Pozzo | 162/190 |
| 4,014,787 | 3/1977 | Shorr | 210/651 |
| 4,021,295 | 5/1977 | Schmaeng | 162/190 |
| 4,115,188 | 9/1978 | O'Brien | 162/190 |
| 4,141,686 | 2/1979 | Lewis | 422/24 |
| 4,155,845 | 5/1979 | Ancelle | 210/650 |

FOREIGN PATENT DOCUMENTS

| | | | |
|---|---|---|---|
| 562135 | 8/1958 | Canada | 162/190 |
| 49-61956 | 6/1974 | Japan | 210/650 |
| 51-43849 | 4/1976 | Japan | 210/748 |
| 1236019 | 6/1971 | United Kingdom | |

OTHER PUBLICATIONS

Polymerization and Polymer Modification by Ionizing Radiation, Pinner, Britsh Plastics, 1962, vol. 35, pp. 518-525.
Control of the Deposition of Silicon Nitride Layers by 2537 Å Radiation, J. Electrochem. Soc., vol. 119, No. 3, Mar. 1972, 372-376.

*Primary Examiner*—Ernest G. Therkorn
*Attorney, Agent, or Firm*—James T. FitzGibbon; Angelo J. Bufalino

[57] ABSTRACT

A method of treating chemical process water which contains dissolved solids, usually of a biodegradable organic nature. According to the invention, the dissolved organic solids, which are objectionable because they cause process equipment corrosion, undesirable product and process odors and pollution, are treated with ultraviolet light. The light treatment causes dissolved materials of relatively simple chemical structure to react and create more complex, less soluble materials which can easily be removed from the system as they become less soluble. The method is applicable to papermaking and numerous other industrial processes using large quantities of process water.

6 Claims, 8 Drawing Figures

METHOD OF TREATING CHEMICAL PROCESS WATER

This is a continuation-in-part of application Ser. No. 13,088, filed Feb. 21, 1979, now U.S. Pat. No. 4,221,634.

BACKGROUND OF THE INVENTION

The present invention relates generally to water treatment, and more particularly to methods and apparatus for treating water having dissolved solids such as so-called "white-water" used in paper processing, so as to reduce the biochemical or biological oxygen demand (B.O.D.) and also lower the concentration of dissolved organic solids in the white water. The invention relates to treatment of all types of process waters, including water used in brewing, food processing, pharmaceutical manufacture, and other industries.

Briefly, the invention utilizes various techniques to increase the molecular weight and particle size of dissolved solid materials so the materials can be removed by precipitation, or by ultrafiltration, or by a combination of the two, preferably using polymerization to render dissolved solids in the process water less soluble, and then to apply ultrafiltration to the water to concentrate the solids in a recycle water system, and ultimately to remove the solids from the recycle system after they have been sufficiently concentrated.

While the manufacture of paperboard and other paper products, as is well known, requires a great deal of water, other industries also use large quantities of process water, or use dissolved solid wastes which are difficult to eliminate, or both.

Specifically, in the paperboard manufacture, waste paper products are pulped and refined, and then added to water to make a fiber slurry. The slurry is fed to one or more cylinder chests wherein the fibers are picked up from the slurry. The fibers are then transferred from the cylinders to a continuously moving screen, with each cylinder adding enough fibers to make an individual ply. Thus, a multiple-ply paper product is deposited and then removed from the screen after being passed through a series of rollers which squeeze the wet product to remove excess water therefrom.

Because of the increasing concern over water pollution, the increased cost of water, and the rapidly increasing cost of energy, there has been an increased interest in methods and apparatus for more efficient paper manufacture and processing.

Referring now to one problem in the paper industry, if white-water, particularly white-water used in the manufacture of paper from recycled paper products such as newsprint, kraft paper, paperboard and other box cuttings, etc., is discharged into open waters, serious environmental damage results because the white-water has a high biological oxygen demand.

Oxidation of white-water products depletes available oxygen in the water below desirable levels, damaging or threatening marine life supported by the ecosystem of which the stream or pond forms a part.

It is possible to avoid this problem by creating large treatment ponds or the like wherein the white-water is stored until the solids dispersed therein settle out, and wherein the oxygen demand is eventually satisfied from the air or elsewhere from the treatment tank area. Because such ponds may be specially provided, damage to other water is avoided. However, the white-water treatment pond approach is seriously disadvantageous in that it is time consuming, requires significant space, often creates highly obnoxious odors, and very importantly today, is highly wasteful of energy.

The energy waste involved in the reuse of treated white-water comes from the requirement of reheating the clarified water up to mill use temperatures after it has been allowed to cool to ambient temperatures over a period of several days or more. With the high cost of gas, oil, or coal, the cost of lost heat is not only enormous, but is essentially a loss without offsetting advantages.

If the white-water is reused without treatment, the solids content thereof builds up to the point where machinery becomes clogged and the paper product becomes damaged by discoloration, obnoxious odor, or both. The problem of solids buildup in white-water is a recurring problem not only because of the wide variety of recyclable papers fed to the stock chest, but also because the nature of the feed material is more or less uncontrolled. Examples of the materials which are present in the white-water resulting from recycling paper are carrier oils, the vehicle components of newsprint inks, residual lignins and other binders from recycled paper, starch and related decomposition products of cellulose, gums and perhaps other natural dispersants from paper adhesives, wet strength resins of various kinds, including ketene dimers, for example, and a wide variety of other organic materials. Moreover, there are many inorganic materials, such as carbonates, clays, and the like, a number and variety of which may be surface active and resist settling or separation by usual methods.

In addition to the problem of odor, white-water with the above contaminants, particularly in the presence of bacteria, can become extremely corrosive, and, if not neutralized, will rapidly damage pipes, valves, and other elements of the paper processing equipment.

In other industries, such as the pharmaceutical industry, the amount of process water used is large, but a more important problem is the nature of the material dissolved in the process water. For example, in the pharmaceutical industry, the materials in the process water are by-products of drug manufacture, for example.

These compounds include complex halogenated cyclic and aromatic compounds, including heterocyclic compounds of various kinds, which it is desired to remove from the water. As in most organic reactions, the manufacture of a principal product involves the creation of byproducts which are created by side reactions as well as those created by incomplete reactions.

In other industries, such as the brewing industry, economic problems of dealing with effluent, including problems of odor and B.O.D., remain serious.

In still other industries, such as in the food processing industries, various soluble wastes, such as sugary materials, build up and create process water problems, as well as problems of eventual disposition. Other process industries, including those involving polymerizable organic materials such as starch or other polysaccharides, the industries involving natural fermation or distilling, such as the wine and liquor industries, etc., and still other industries involving soluble oil such as fusel oils or the like, also have problems of separating undesirable materials from their process water.

According to the invention, an apparatus for exposing the white-water to ultraviolet radiation makes possible the reduction of both dissolved solid materials and biological oxygen demand. Although the exact mechanism of the invention is not understood in detail, and although the invention is not limited to any particular theory of operation, it is believed that the exposure of the water to ultraviolet light serves to polymerize the simpler components of the materials in solution, rendering them insoluble and capable of ready separation. According to the invention, the process of separation can be carried out continuously so that the white-water may be used over and over, with fibers being added periodically and impurities being removed continually, without creation of a process atmosphere which is characterized by corrosion, by obnoxious odors, or by pollution of outside waterways, no need for treatment lagoons, and the temperature drop and hence energy loss of the white-water during processing is minimal.

In another aspect, the invention relates to the use of the polymerizing ultraviolet radiation just referred to in conjunction with the principles of ultrafiltration, whereby the polymerizing radiation is used to increase the particle size or molecular weight of the dissolved solids to the point whereat ultrafiltration can be economically and effectively done, without necessarily increasing particle size to the point at which the dissolved materials are readily able to be precipitated. Consequently, the invention involves using not only polymerizing radiation, but the combination of such radiation with means for precipitating solids and for enhancing the speed and effectiveness of their removal from, process water by ultrafiltration, and further includes using such processes not only in papermaking but in the other industries referred to above, and, in fact, in any industry having particular problems of eliminating dissolved solids and/or encountering high costs in heating, cooling and reheating process water.

In view of the shortcomings of the prior art methods of treating white-water used in paper processing, it is an object of the invention to provide an improved method of processing papermaking white-water.

Another object of the invention is to provide a method of treating white-water which can be carried on continuously during the papermaking process and which does not require removal of white-water periodically for processing in treatment lagoons.

A still further object is to provide a white-water treatment method which is adaptable for use with existing paper processing equipment and which may be carried out continuously on the white-water so as to render the white water reusable indefinitely in the papermaking process.

Another object is to provide a method of treating paper-making white-water which cost as little or less than prior art treatments exclusive of the heat savings able to be achieved.

Still another object is to provide a white-water treating method which can be performed in an apparatus which can be readily added to existing paper processing equipment and which does not require changes to be made in such equipment.

Another object is to provide a method of white-water treatment which includes the step of treating the white-water with ultraviolet light to induce polymerization of dissolved, polymerizable monomers into higher molecular weight, perhaps highly branched compounds, of decreased solubility so as to render the resulting compounds capable of ready separation from the white-water.

Yet another object is to provide a method of white-water treatment which permits white-water to be treated at ambient temperatures characteristic of the papermaking process, thus eliminating the need for cooling and reheating the white-water.

A still further object of the invention is to provide a method of reducing the biochemical or biological oxygen demand of papermaking white water so as to reduce the potential for creating an anaerobic atmosphere which is conductive to the growth of anaerobic bacteria, which in turn create highly corrosive, odoriferous organic products, such as hydrogen sulfide, butyric acid, and other such compounds.

Another object is to provide a method of treating papermaking white-water so as to minimize the formation of by-products, particularly short chain organic acids, which tend to impart undesirable odors to the finished paper products.

A still further object is to provide a method of treating papermaking white water which eliminates or reduces the buildup of dissolved orgnaic solids which tend, particularly when the process equipment is shut down to clog or foul process plumbing and fiber mats or screens on which the paper is laid.

Another object is to provide a method of papermaking white-water treatment which enables the white water to be reused indefinitely, with the method involving the continuous maintenance of accpetable minimum level of dissolved organic solids and an acceptably reduced biological oxygen demand in the white-water.

A still further object is to provide a method of treating papermaking white-water which includes treating the water by withdrawing portions thereof from the system from time to time, thereby permitting the volume of treated water to be independent of the total volume being used by the mill at any given time.

Another object is to provide a method of treating papermaking white-water in which the water may be treated periodically or intermittenly, whether on a sampling basis or otherwise, and still achieve the intended result of reducing dissolved organic solids and biological oxygen demand.

A still further object is to provide a method of treating white-water which will eliminate or reduce biological induced corrosion of the process equipment used in papermaking.

Another object of the invention is to provide a method of treating white water in industries other than papermaking for the purposes set forth in the above objects, and with a view towards obtaining the advantages referred to above.

A still further object of the invention is to provide a method of treating process water which includes increasing the particle size of dissolved solid materials in the process water, and then subjecting the process water, either wholly or in part, to ultrafiltration for concentration and removal of such solids.

A still further object is to provide a method of removing dissolved solid materials which includes polymerizing such materials at least in part by the application of ultraviolet radiation, then treating at least a portion of the process water with ultrafiltration, using the ultra-filtered process water repeatedly in the process while increasing the dissolved solids in the concentrate so that such concentrate may be discarded or otherwise treated for the elimination of such materials.

Another object of the invention is to provide methods for treating process water in the food and beverage industries, in the drug industries, and in other industries wherein solids dissolved in the process water may be polymerized or otherwise chemically reacted so as to increase their molecular weight and thereafter, with or without ultrafiltration, to remove such dissolved solid materials from the process water so as to increase the overall cost effectiveness of the process in question.

These and other objects and advantages of the invention are achieved in practice by treating process water at process temperatures with ultraviolet light of a preferred frequency so as to polymerize dissolved materials and to separate the resulting materials from the process water intermittenly or continuously during the process in question.

The objects of the invention are also achieved by treating some or all of the process water treated with ultraviolet light by an ultrafiltration process, and using the dissolved solids of increased molecular weight as a method of increasing the effectiveness of the ultrafiltration process.

A still further object is to provide a method of rendering the ultrafiltration process used in industry more cost effective and more readily adaptable to use in other areas by controlling the character of the process water which is subject to ultrafiltration. The invention is intended to render ultrafiltration more adaptable as a process to industries wherein it was not previously able to be used, by presenting to the ultrafiltration system process water which is composed of materials which can be economically and effectively treated by such process.

The manner in which these and other objects and advantages of the invention are achieved in practice will become more clearly apparent when reference is made to the accompanying detailed description of the preferred manner of practicing the invention set forth by way of example and illustrated in the accompanying drawings, wherein like reference numbers indicate corresponding parts throughout.

DESCRIPTION OF THE PREFERRED EMBODIMENTS OF THE INVENTION

While the invention may be embodied in different forms, and while the treatment which is the subject of the invention may be used in processes of various kinds, including different papermaking systems, a detailed description of one embodiment of the invention will be made wherein the process is papermaking and wherein the paper is made on a so-called cylinder board machine used to make multiple-ply paperboard.

Figure 1:
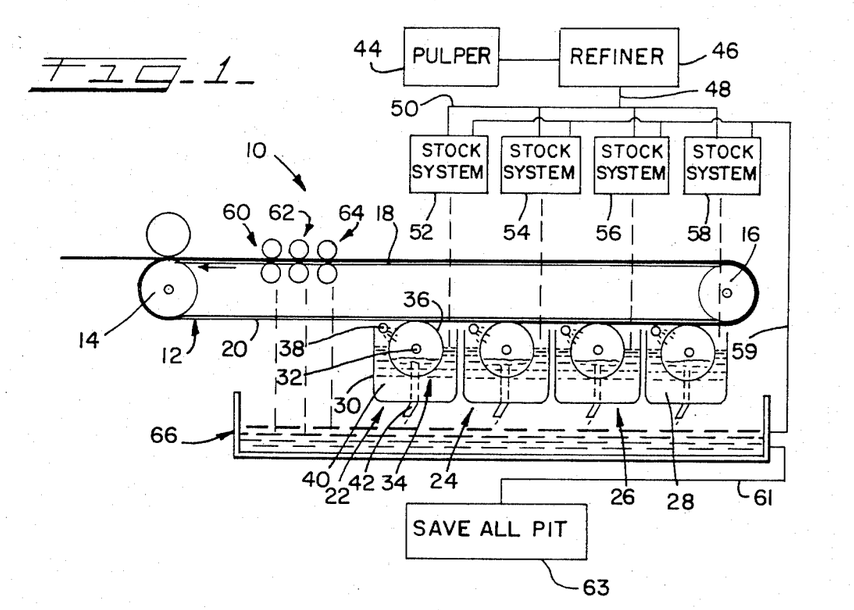
FIG. 1 is a diagrammatic side elevational view showing the principle elements of a typical papermaking machine and showing the feed of the paper stock to the stock chests, the pickup cylinders, the moving screen which picks up the fiber from the cylinders and the paper machine pit.

Referring now to the drawings in greater detail, FIG. 1 shows a typical cylinder type papermaking apparatus generally designated 10 and shown to include a continuous fiber belt 12, supported at one end by a drive roller 14 and at the other end by an idler roller 16. The upper run 18 and the lower run 20 of the fiber screen 12 are maintained under tension so as to be relatively taut.

Beneath the lower run 20 of the screen 12 are disposed a plurality of machine vats, with four vats 22, 24, 26, 28 being illustrated in FIG. L. Inasmuch as each vat is identical except for the stock disposed therein, a description of one vat only is given. Typically, the cylinder vat 22 includes a water-tight exterior housing 30, supporting an axle 32 journalling a rotatable cylinder generally designated 34 and having an exterior surface 36 formed from a screen or like porous or foraminous material. A shower head 38 is also disposed within the housing 30, with the openings in the head 38 being directed in facting relation to the upper part of the cylinder 34.

In operation, the cylinder 34 rotates clockwise, picking up fibers from the slurry 40 in the vat 22, and depositing the fibers on the surface of the cylinder 36. The spray head 38 limits the amount of fibers building up on the cylinder. As may be seen, the water level on the interior of the cylinder is lower than that in the cylinder vat 22, with the interior being drained by the tube 42.

Other typical elements of the apparatus 10 shown in FIG. 1 included the pulper 44 wherein the fibers are dispersed by a slurrying apparatus known in the paper industry. The fibers from the pulper are passed to a refining unit 46 where desirable properties are developed in the slurry. The main outlet line 48 from the refiner 46 is connected to a manifold 50 from which the individual stock system chests 52, 54, 56 and 58 are supplied with the paper slurry. Here the solids content of the slurry is reduced, typically from 3% to 1%, by the addition of water through line 59 to which reference will be made later.

Each stock chest 52, 54, etc. feeds the diluted papermaking slurry to its associated cylinder vat 22, 24 etc. in a known manner. In the illustrated example, a slurry from the same refiner is fed to all the stock chests, which are, in turn, fed to their associated cylinder vats. From this, it will be appreciated that a paper product made on this machine will have four plies of substantially identically composition. If additional plies are desired to be made, it is customary to provide a stock chest for each ply which is made of a different composition.

In those cylinder machines which make paperboard with different plies, there is usually one chest which supplies the base ply or so-called bottom or back liner, four to six or more chests which apply identical, so-called filler or middle plies and one or two chests which apply a so-called top liner or top ply. In such system, there would be three different paper slurries, but at least some, and perhaps all, of the white-water would be commonly used, as will appear.

As shown, the apparatus also includes a plurality of pairs 60, 62, 64 of nip rollers used to extract the water from the just-laid paper product by squeezing the water through the porous fiber belt 12. The water thus extracted, as shown by the phantom lines, along with the drain product from the cylinder stock chest 22, 25 etc. is returned to a large machine pit 66. The machine pit 66 supplies white-water to the line 59, referred to above, which provides white-water for dissolution to the stock chests 52, 54, etc. In addition, a line 61 feeds white-water from the machine pit 66 to the so-called save all pit 70. This pit 70 typically comprises a large concrete vat or tank in the passing of the paperboard mill. Consequently, most or all of the process water is directed to the so-called save all pit 70 at one time or another during processing.

According to the invention and, in keeping with ordinary paper processes, the white-water from the save all pit 70 is white-water which is the subject of the invention.

Figure 2:
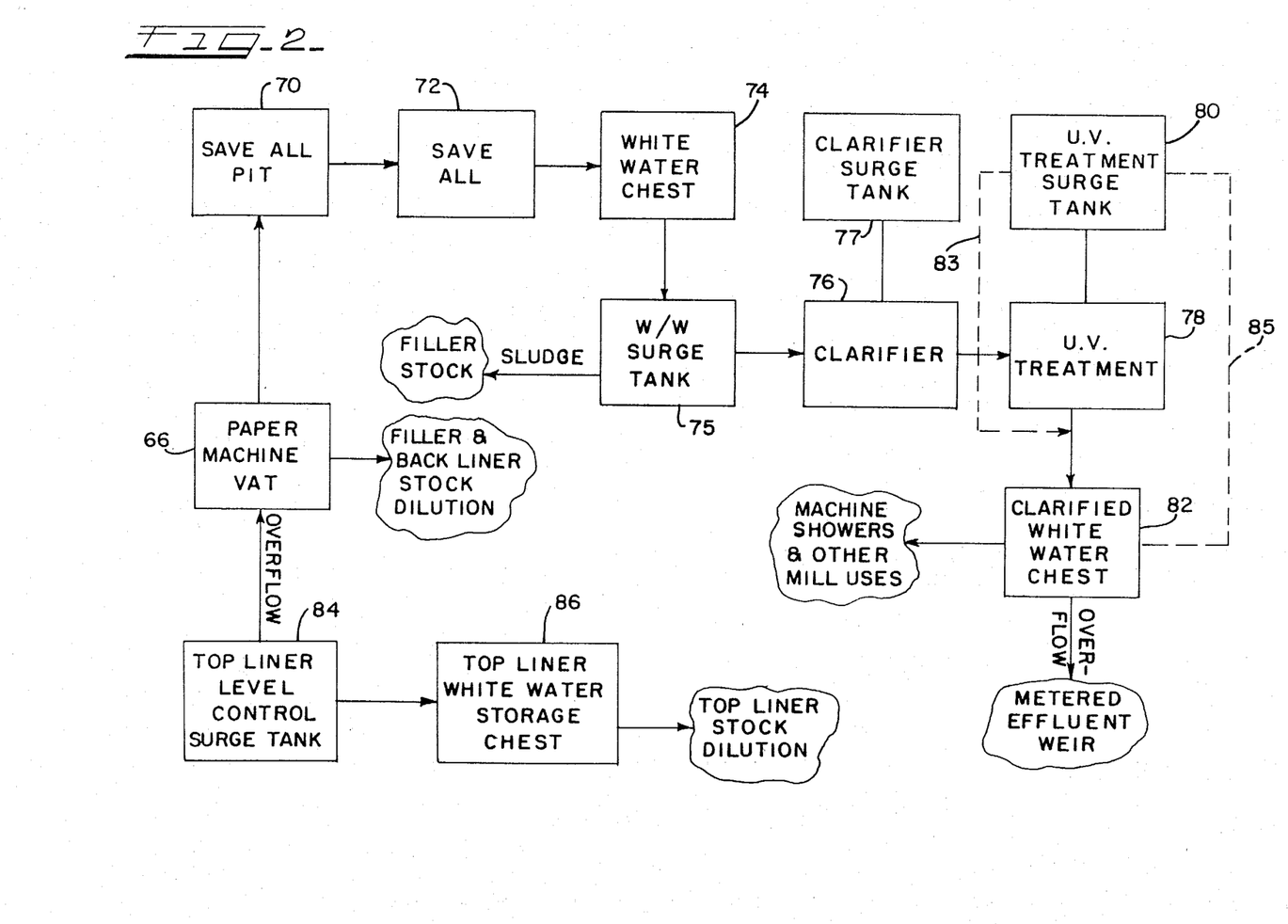
FIG. 2 is a block diagram showing the operation of a typical paper mill process water system and further showing the white-water treatment which is the subject of the invention.

FIG. 2 illustrates circulation of the process water in a typical paper mill, not necessarily that using the machine of FIG. 1. This drawing shows the paper machine pit 66, the "save all" pit 70, a save all water supply 72, a white-water chest 74, a white-water chest (single) tank 75, a clarifier 76, a clarifier surge tank 77, an ultraviolet treatment cell or station 78, a treatment cell surge tank 80, and a clarified water chest 82, all connected as shown. Phantom lines 83, 85 show that water from the clarifier 76 may bypass the treatment cell 78, if there is an unusual water demand, or for any other reason. FIG. 2 also illustrates a top liner lever control surge tank 84 and a top liner white-water storage chest 86.

While processes such as those illustrated in FIG. 2 are known to those skilled in the art, a brief description thereof will illustrate certain advantageous applications of the invention.

Beginning for example with the paper machine pit 66, which may be that shown also in FIG. 1, this unit receives over-flow from the various cylinder stock chests as well as water from the rollers 60, 62, 64 which squeeze water from the paper product. While a certain amount of the water from the machine pit 66 goes to dilute the filler and back liner stock, most of the water goes to the "save all" pit 70. This is the lowest grade of white-water in the process water system. The "save all" 72 typically consists of a cylinder vat in which the smaller fibers are removed from the white-water so that some reclamation of excess fibers takes place at this station. This reduces the fiber content of the white-water and the fibers collected may be reused or discarded, as desired. The white-water chest 74 might typically have a capacity of 10,000 to 15,000 gallons.

The white-water then is passed through a surge tank 75 to the clarifier 76, which is typically a gravity clarifier known in this industry. Here, suspended colloidal material is removed from the bottom of the clarifier as a sludge and used for filler stock, while the clarified white-water is passed into the ultraviolet treatment cell 78 of the invention from the surge tank 77. A more detailed description of the ultraviolet treatment cell 78 appears hereinafter.

From the treatment cell 78, the water may pass to the treatment cell surge tank 80 or to the clarified white-water chest 82. In the alternative, some or all of the clarified white-water may bypass the treatment cell 78 and pass, by way of lines 83, 85 from the surge tank 80. The clarified white-water chest 82 contains the purest or highest quality white-water in the process. The overflow is metered through an effluent weir, while the major portion of the clarified white-water passes from the chest 82 to an outlet from which it is directed to the machine showers 38 or to other mill locations.

Referring again to the paper machine pit 66, it will be noted that this pit also receives the overflow from the top liner level control surge tank 84. This tank supplies the top liner white-water storage chest 86 which, in turn, is used to dilute the stock marking up the top liner of the paper product.

From the foregoing, it will be seen that some fibers are periodically removed from the white-water and that the white-water is clarified and reused continually in the process. The tanks 84, 86 presume the use of a higher grade or different quality top liner stock, and accordingly are filled from their own paper slurry. A significant proportion of the top liner stock white-water overflow goes indirectly to the save-all pit 70, where it is combined with the other process white-water. The major portion of the top liner white-water, however, is recirculated within the top liner white-water system itself.

Figure 4:
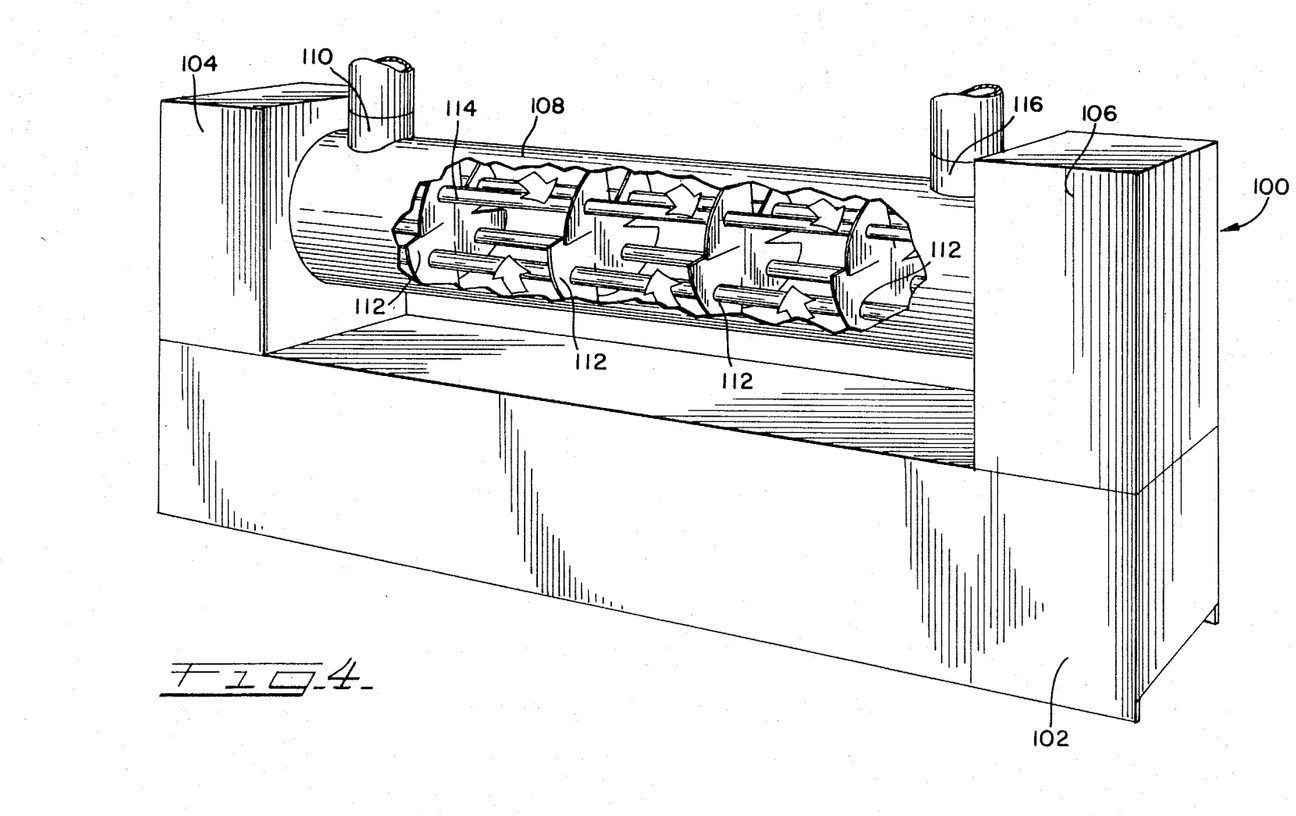
FIG. 4 is a perspective view, with portions broken away, of a typical ultraviolet light treatment apparatus suitable for use in practicing the present invention.

Referring now to the water treatment cell 78, FIG. 4 shows that this cell may consist of a commercially available ultraviolet unit generally designated 100 and sometimes used as an ultraviolet water sterilizer. A unit suitable for use in the present invention may be one sold under the trademark "Aquafine" and manufactured by the Aquafine Corporation of Burbank, Calif. In the form shown in FIG. 4, the unit 100 includes a main housing 102 containing the electrical components, a pair of upwardly extending support portions 104, 106 having between them a horizontally extending treatment tube 108. An upper inlet 110 admits water into the interior of the tube 108, with the water being directed about in a turbulent within the tube 108 by the action of the baffle plates 112. These plates 112 also serve to locate a plurality of longitudinally extending high intensity ultraviolet lamp tubes 114. Preferably, the lamps 114 are fused within transparent quartz sleeves. Consequently, water flowing into the inlet 110 and out the outlet 116 will be exposed to significant ultraviolet radiation because the polymerization initiated by the ultraviolet light may result in the precipitation of organic materials, the treatment unit 110 may be provided in parallel so that one may be turned off periodically for cleaning without interrupting the performance of the process.

As will appear, the amount of ultraviolet energy required to initial polymerization is not large and accordingly a unit such as that shown which might have a rating of from one up to twenty kilowatts, may be operated intermittently. In the alternative, a small unit having a 50 watt-hour capacity may be operated continuously. The foregoing figures typify values used in a mill having a process water flow rate of 1,000 gallons per minute. The preferred form of treatment unit emits u.v. light at a wavelength of 2537 Å.

Figures 3, 5:
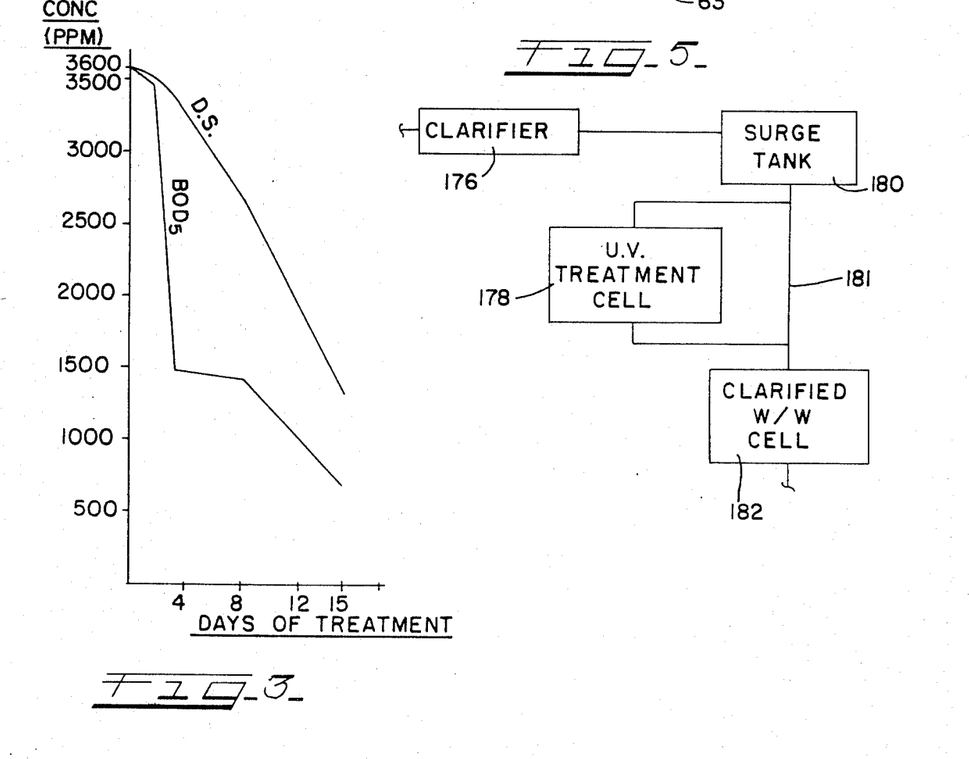
FIG. 3 is a diagram showing the reduction of the concentration of dissolved solids and biological oxygen demand in the white water versus the length of treatment according to the invention.
FIG. 5 is a fragmentary diagrammatic view of a portion of the paper mill process water system shown in FIG. 2 but differing therefrom in detail.

In use, assuming that the white-water treated has the dissolved solids values and B.O.D.$_5$ values shown in FIG. 3, the treating unit will, over a period of a few days, reduce both dissolved solids (D.S.) and B.O.D. to about 40% of their original values and then continue to reduce these values until equilibrium is reached after about eight to fifteen days' treatment.

While the invention is not intended to be limited to any particular theory, and while any mechanism of operation does not form a necessary part of the invention, it is believed that the reaction mechanism may be explained as follows: Since a significant part of the dissolved organic material in the white-water of a typical papermaking process possess a measurable biologic oxygen demand, (measured as a five day demand—B.O.D.$_5$) such organic material would have to be of relatively simple organic structure in terms of chain length and branching. That is, most or all of such compounds would have a relatively low molecular weight and would be readily biodegradable. Hypothestizing that the ultraviolet light creates free radicals which would initiate polymerization of these low molecular weight, polymerizable compounds, the early, relatively sharp drop in the B.O.D.$_5$ level, coupled with the gradual lowering of dissolved solids, indicates that the dissolved material, upon exposure to ultraviolet light, develops into more complex, less soluble and less biodegradable material.

It will be observed, in this connection, that the polymerization activity is not thought to be biologic in nature, inasmuch as the ultraviolet initiation energy is derived from a light tube which is normally used commercially as a sterilizer.

However, assuming that the molecular weight and complexity of the organic materials results from polymerization initiated by ultraviolet energy, the explanation of the mechanism is quite logical. The unsaturated and particularly conjugated structure molecules readily tend to form more complex free radicals which undergo further reactions such as those undergone in typical double bond polymerization, e.g., vinyl polymerization.

Referring now to the kinetics of the postulated reaction, the rate is not high by absolute standards, but is high considering the reaction conditions and the varied nature of the starting products. Moreover, the white-water is effectively treated by the inventive process more rapidly than it would be when treated in the lagoons used in prior art treatment.

In actual use, it was noted that certain of the white-waters, after being treated for an extended period, sometimes developed a brown or even dark red-brown color. This is thought to be explainable, consistent with the present hypothesis, on the basis of the eventual production of molecules having the conjugated resonant structures known to form in complex molecules.

As would be expected when polymerization continues, the molecular weight and complexity of the products is such that their solubility limits are exceeded, and the concentration of dissolved solids is reduced, simply because the complex reaction products are precipitated out of the white-water. As a consequence, during and after treatment, the concentration of those soluble white-water materials which create continuing and increased biochemical or biological oxygen demand is greatly reduced.

The postulate that polymerization occurs has been verified by infrared and nuclear magnetic resonance (nmr) spectroscopy of white-water before treatment, and separate analysis of the supernatant white-water and the sludge resulting from treatment thereof. These analyses show the initial presence of virtually no long chain materials in the supernatant layer and sludge before treatment, and show that the supernatant liquid contains virtually no such materials after treatment, but that the precipitated sludge contains significant amounts of materials having relatively great chain length and complexity.

Referring now to the certain advantages of the invention, when dissolved organic solids build up to an excessive level in papermaking white-water, the resulting inordinately high biological oxygen demand, creates an anaerobic atmosphere. This encourages growth of sulfate-reducing and other thermophilic anaerobic bacteria, which in turn create highly corrosive hydrogen sulfide and other compounds which rapidly damage process equipment, sometimes even equipment made from relatively corrosion-resistant materials such as stainless steel.

As indicated above, an anaerobic atmosphere permits the bacterial which decompose the dissolved solids in the white-water to create short chain organic acids, and perhaps other miscellaneous organic decomposition products. These acids, particularly, create obnoxious odors in the product, the process water system and the surrounding atmosphere, and further contributes by corrosion problems in addition to those corrosion problems caused by other mechanisms within the system.

From the standpoint of dissolved solids only, lowering the concentration of dissolved solids alleviates a problem which is common in the industry, that is, the problem of deposition of foreign materials on the machine felts, screens, etc. Such depositions occur when the papermaking process is stopped or at other times when temperature of the process water is lowered. When this occurs, certain of the dissolved solid materials take a "set" and adhere to the machine felts or other machine parts, rendering these parts less porous to water. This in turn inhibits proper drainage and increases the likelihood of manufacturing an inferior product.

Referring now to another advantage of the inventive concept, by reason of the fact that white-water treatment may be intermittent or continuous, the treatment cell may be placed either in series or in parallel with the white-water flow system, provided only that it is clarified white-water which is treated. While the invention may function to a certain extent in the presence of unclarified white-water, the presence of collodial or dispersed materials creates turbidity and light scattering which tend largely to destroy the effectiveness of ultraviolet light treatment.

Assuming that it is clarified white-water which is treated, however, it will be understood that the invention operates satisfactorily whether or not the clarified white-water is continuously or intermittently withdrawn from the system, and whether or not the clarified white-water passing through the treatment system is treated continuously.

As long as all the water is exposed to ultraviolet light, over a period of time, statistically speaking, the treatment will be successful as long as polymerization is initiated and permitted to continue, the invention may be practiced successfully.

In this conneciton, it will be understood that it is not necessary that the polymerization resulting in molecules of increased size and decreased solubility occur totally in the presence of the ultraviolet light. It is believed that the polymerization process occurs throughout substantially all, or at least a major part of, the treatment cycle, with the ultraviolet energy serving only to initiate polymerization from time to time. Accordingly, it is not necessary that the ultraviolet light energy be directed to the white-water for extensive lengths of time, or that the white-water have any particular residence time in the u.v. treatment cell. This feature of the invention simplifies making the physical connections and "plumbing" necessary to adapt the invention to existing white-water systems.

FIG. 5 shows the elements of an apparatus having the treatment cell in parallel with the flow of the bulk of the process water. As illustrated, the clarifier 176 feeds the clarified white-water chest 182 through the surge tank 180. The u.v. treatment tank 178 is in a parallel or side arm configuration with respect to the line 181 between the tank 180 and the chest 182, and treats clarified white water on its way to the chest 182.

FIG. 3 illustrates the reduction of the DS and B.O.D.$_5$ values from 3600 ppm to 1500 ppm, and then downwardly towards values of less than 1,000 over the periods indicated. These values were obtained in one particular papermaking operation wherein the initial values were not particularly high.

Where the initial values are much higher than those shown in FIG. 3, such as 5,000 to 8,000 ppm or more initially, as commonly occurs, and even more dramatic reduction may be obtained, inasmuch as the initial concentration is higher but final concentration can be reduced to at least the values shown. The reason for the excellent performance of the invention in systems having B.O.D.$_5$ and DS values up to 8,000 ppm and higher is that, from the standpoint of kinetics, the greater concentrations increase reaction rates. Hence, in general the method of the invention operates better and is more efficient in systems with high initial B.O.D.$_5$ and DS values.

Referring now to another matter, namely, the heat which can be saved by using the method of the present invention, it will be assumed that the invention is being practiced in a paper mill which makes 165 tons of paper per day. A mill of this size typically discharges about 1,000 g.p.m. of white-water into the treatment lagoons, and takes on an equal amount of water, which must be heated, either from treated white-water or fresh water, or both.

Assumihg that the inlet water has an ambient temperature 60° F., and is discharged into a treatment lagoon at 115° F., the temperature drop is 55° F. With 1,000 g.p.m. aggregating 60,000 gal./hr., 1,440,000 gal./day, and assuming the density of water to be 8.33 pounds per gallon, the total heat loss in such a system is 660,500,000 B.T.U.

According to the invention, the temperature drop of the process water can easily be limited to 1° F. or less. In such a case, only 12,000,000 B.T.U.'s would be lost, saving nearly 650,000,000 B.T.U. daily.

According to the invention, the white water may be recirculated for days, weeks or even months at a time, keeping the organic dissolved solids at a desirably low level.

Another feature of the invention is that, where those low B.O.D. and organic DS levels may be maintained, biocidal control process treatments may be carried on effectively, whereas such processes were not effective where organic DS and B.O.D. levels were excessively high.

Referring now to other applications of the process of the invention, industries other than the paper industry can utilize the principles of the invention. For example, in industries dealing with organic products and having substantial waste water, such as malt beverage, pharmaceutical, and textile industries, those materials which in the past created effluent problems can now be polymerized, precipitated and then removed. Thus, the contaminated water can be treated effectively by this method and then treated discharged without polluting waterways.

The application of the process of the invention is not necessarily limited to those cases wherein the dissolved solids are only those which may be polymerized or degraded by biological action. In other words, there are several known industrial processes wherein the process water contains dissolved solids which may be polymerized to reduce their solubility, but in which the solids may be eliminated either very slowly or not at all by biological methods.

In such cases, the ultraviolet-initiated polymerization method of the invention is applicable, although the treated liquids might have minimal or no measurable B.O.D.$_5$. Accordingly, the invention is applicable to all cases wherein dissolved solids may be removed by ultraviolet-initiated polymerization resulting in eventually reduced solubility of such solids.

Figures 6, 8:
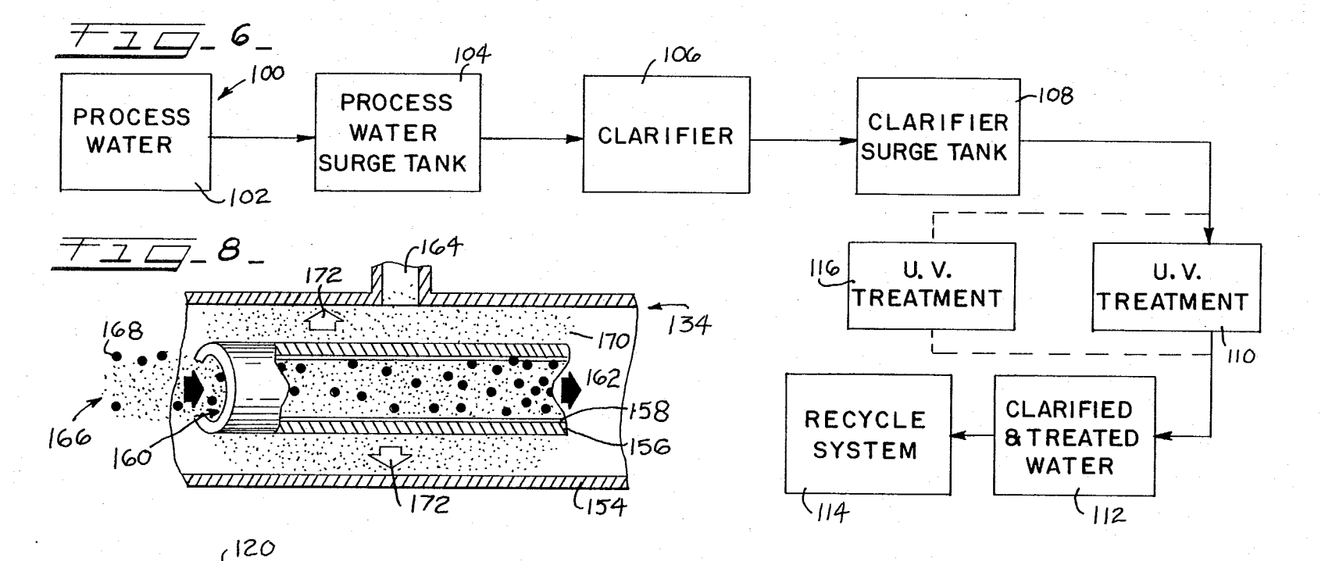
FIG. 6 is a block diagram of a process according to the invention and illustrating the manner in which some of the ultraviolet treatment cells may be arranged in an apparatus using the process of the invention.
FIG. 8 is a diagrammatic view showing one manner in which process water is treated by ultrafiltration according to the invention.

Referring now to FIG. 6, a somewhat modified process generally designated 100 is shown. In this process, process water 102 is passed to a process water surge tank 104 from which the water passes to a clarifier 106, wherein settling occurs.

After the process water has settled in the clarifier, it passes through a clarifier surge tank 108 and through a first ultraviolet treatment cell 110, from which it then passes into a clarified and treated water cell 112 for eventual passage into the recycle system generally designated 114. In this construction, one or more additional ultraviolet treatment cells 116 may be provided in parallel with the treatment cell 110. In one application, the treatment cells may be used in the alternative so that one or more cells may be shut down for maintenance or processing. Also, two or more cells may be present and the amount or duration of treatment may be varied by using for example, two or more cells with process water requiring a significant amount of treatment, and using only a single or other reduced number of cells for treating process water under less severe conditions.

Figure 7:
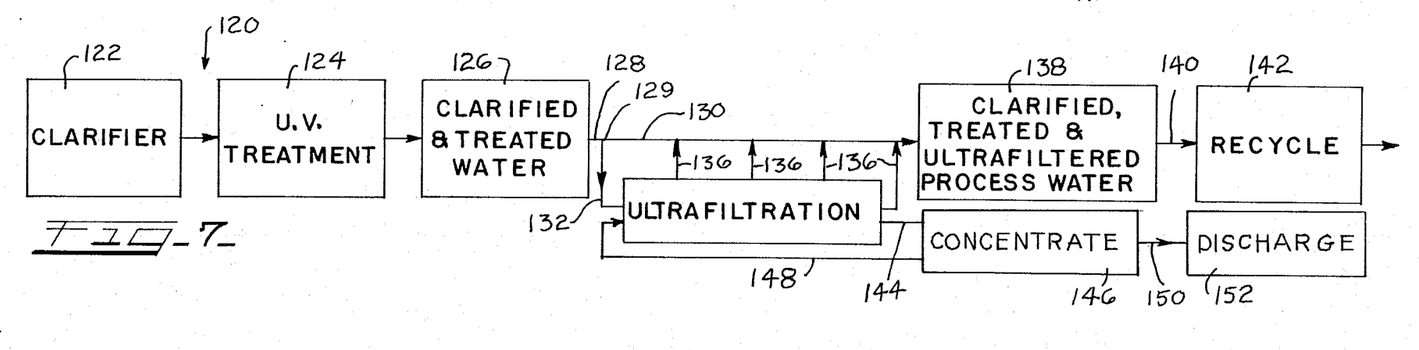
FIG. 7 is a schematic view showing the manner in which the ultrafiltration step of the invention may be incorporated into an apparatus adapted to carry out the process of the invention.

Referring now to FIG. 7, a process generally designated 120 is illustrated wherein it will be understood that flow takes place in accordance with accepted principles in the particular industry selected. It will be assumed that the water has gone through whatever process is required, and that insoluble materials are allowed to settle in a clarifier 122. Thereafter, the material is passed, with or without the use of a surge tank, into an ultraviolet treatment cell 124. This cell may consist of any one or more of the treatment cells of the type referred to elsewhere herein, and may comprise an intermittent or continuous treatment apparatus, or one involving a parallel or pass-through process, as desired.

From the ultraviolet treatment cell 124, the process water passes into a clarified and treated water cell 126, from which it is then passed, via an outlet line 128 to a tee 129. From here, the water moves through either a bypass line 130 or an ultrafiltration treatment line 132. Water passing through the line 130 is merely shunted or bypassed around the ultrafiltration cell 134, while water passing through the line 132 enters the ultrafiltration cell or chamber 134. From here, the filtrate passes, by way of lines 136, back into the bypass line 130, being collected in the clarified treated and ultrafiltered process water tank 1. From here, the water passes by way of line 140 into the appropriate recycling chambers 142. Liquid material ("concentrate") containing the higher molecular weight materials separated by ultrafiltration pass from the ultrafiltration chamber 134 through line 144 into the concentrate cell 146. From here, the concentrate is fed through line 148 back into the ultrafiltration cell 134. This process results in gradually increasing the concentration of solids in the concentrate, and passage of additional purified process water through the lines 136 into the bypass line 130. After passage of time, the concentration of materials in the concentrate cell is sufficiently great that this material may be emptied, as through line 150, to a discharges station 152.

Referring now to FIG. 8, the construction of a typical ultrafiltration cell or module 134 is shown. In this cell, there is an impermeable outer tube or sleeve 154 and a semi-permeable inner tube or sleeve 156, having a membrane 158 on the inner surface thereof. The inner tube 156 includes an exterior support tube, typically made from a fiberglass-reinforced expoxy or like resin, holding the semi-permeable membrane 158. The tube 156 has an inlet generally designated 160 and an outlet generally designated 162, while the outer tube 154 contains one or more outlets 164. The process water generally designated 166 passes through the inlet 160 of the inner tube 156, carrying with it various enlarged particles 168 shown as black dots in FIG. 8. These materials are unable to pass through the filter membrane 158, and consequently pass along the inner tube 156 to its outlet 162. This outlet 162 is connected to the pipe 144 in FIG. 7. The solvent, (in the usual case, water) together with the very finely dispersed materials represented by the plural small dots 170 will pass through the ultrafiltration membrane and depart from the inner sleeve 166 radially as shown by the smaller light arrows 172. This water, with a number of entrained particles 170 which are small enough to pass through the membrane 158, will exit the inner tube 156 through passage 164. This is connected by lines such as those shown at 136 in FIG. 7 to the remainder of the process system.

Consequently, as will be seen, the large particles 168 which have been created by polymerization or other reaction induced by the ultraviolet treatment, remain in the inner tube or sleeve of the ultrafiltration apparatus where the solids concentration gradually builds up. These materials cannot pass through the filter 158, whereas the water and the smaller dissolved materials can do so. Liquid material, including the dissolved solids too large to pass through the filter are recirculated through the line 148 and again pass through the tube 156 (FIG. 8) until the concentration reaches the practical limits imposed by the ultrafiltration system. After the materials have reached this concentration, some or all of the concentrate is passed through a line 150 into the discharge cell where, as a concentrated mass, it may be dealt with as desired.

The advantages of using the modified system shown in FIGS. 7 and 8 is that it is not necessary to enlarge the particle size of the dissolved solids to a size wherein they will precipitate. In many cases, it is possible to enlarge the particle size of the dissolved solid materials such that they will not pass through the membrane of an ultrafiltration system, but it is more difficult and time- and energy-consuming to increase their particle size by further chemical reaction until they actually precipitate. Consequently, the use of the two systems together takes advantages of the best properties and features of both, with the result that highly effective and economical process water system can be developed.

In other words, the ultrafiltration system is not required to deal with particles which are so small that they would cause clogging and other difficulties with ultrafiltration, and yet the ultraviolet polymerization/reaction system is not required to convert all the material into particles which are large enough to be separated by precipitation and/or flocculation. As a consequence, extreme economy and versatility is made possible for a variety of processes, particularly those using large amounts of process water.

Referring now to various applications of the system just described, the process water used in the brewing industry is susceptible to use of this process. In the past, large amounts of water containing chromophoric groups and further including many organic compounds possessing characteristic of obnoxious odors create difficulties in industrial atmospheres. Such process water may be successfully treated according to either method of the present invention, namely, by ultraviolet treatment above, or in combination with ultrafiltration.

In the pharmaceutical industry, particularly, it is common to arrange a process for the production of the best possible yield of a given end product which is consistent with economic production of that product. However, because of chemical considerations, principles of kinetics and the like, almost all organic reactions are, by nature, reversible and hence usually incomplete. As a consequence, in a typical process operation, not only are byproducts or products of incidental or side reactions created, such products being relatively valueless, but it is not practical to eliminate such products. This is because to do so would require continuation of the particular chemical process well past the stage at which such continuing could be justified on the basis of increased yield of the basic product. In other words, if the most economical process of making a certain desired chemical, including polynuclear, heterocyclic, and other complex compounds, results in the production of 40% principal product and 60% byproducts, and it is then desirable then not to attempt to eliminate byproducts by continuing the reaction, but merely to salvage the yield of the principal product and regard all other compounds present as byproducts. These products themselves create significant problems of handling and ultimate disposition. In the case of halogenated products, for example, their disposition not only involves expense and difficulty, but may create health hazards and/or serious economic consequences. Consequently, it is highly desirable to continue to extract the most economically desirable principal product, and at the same time, to be able to dispose of the byproducts or pollutants with minimal difficulty. This process is readily carried out by the process of the invention.

Another industry in which the principals of the invention are of great value are those chemical processes involving polysaccharides such as sugars and starches, for example. In the candy industry, it is common, because of the relatively water soluble nature of the various sugars used, for them to concentrate in the water phase of the process until problems of disposal, bacterial action, and the like become serious. According to the invention, these materials may be polymerized or otherwise caused to react so as to attain a molecular weight consistent with their removal by precipitation and/or ultrafiltration.

Ultrafiltration systems themselves are commercially available and the operation thereof is well known to those skilled in the art. The schematic illustration of such systems shown in FIG. 8 merely illustrates one such typical unit. The exact type of ultrafiltration system used does not form an essential part of the present invention, nor is the present invention in any way concerned with the novelty per se of such systems. Most or all known systems involve a membrane of a predetermined porosity, and a pump or other means to create pressure drop across the membrane. The best systems are arranged for axial flow of the concentrate, and radial flow of the filtrate. Typical systems useful for the practice of the invention include those made by the Abcor Company of Wilmington, Mass.

In a typical construction, the pore openings in the membrane 138 itself are smaller than 0.005 microns. Theis membrane is covered by the "skin" of the support tube 156 having a pore structure with pores of 0.05 microns or less. One important advantage of ultrafiltration is that the filter does not clog, because passage of the fluid is generally parallel to the filter surface rather than perpendicular to it, as in a conventional filter.

Normal operating pressures of the system may be varied, but are normally about 50 p.s.i.g.

In the present specification, reference is made to "dissolved solids". It will be understood that this expression is used herein because it is customary in certain industries; however, the use of such term in the specification or claims is not intended to imply that the invention is not also effective where the dissolved material is a liquid or is amorphous. For example, many ultrafiltration system are effective in removing liquids such as oils or the like, and the principles of the present invention are applicable thereto.

While the invention is useful in the recycling type papermaking operations described, wherein the starting materials are paper products of various kinds, the invention process is also applicable to papermaking processes wherein the starting materials include wood pulp only, or mixtures of pulp and recycleable paper products.

It will thus be seen that the present invention provides a novel method of treating chemical process water having desirable advantages and characteristics, including those herein pointed out and others which are inherent in the invention. Preferred embodiments of the invention having been described by way of example, it is anticipated that modifications or changes of the described processes will occur to those skilled in the art, and it is anticipated that such modified or changed processes may be practiced without departing from the spirit of the invention or the scope of the appended claims.

I claim:

1. A method of treating industrial process water having therein a given, first concentration of dissolved organic materials characterized by a relatively simple molecular structure, and a given molecular weight, said method being operative to reduce the concentration of said dissolved organic materials in said process water, said method comprising at least intermittently exposing said process water containing said first concentration of said materials of simple structure to ultra-violet light of such wavelength and intensity as is required for initiating a chemical reaction, including polymerization reactions, among said organic materials, allowing said polymerization and other reactions to continue until reaction products thereof are created which have a molecular weight substantially greater than said given molecular weight, and thereafter collecting said reaction products from said process water, and periodically removing said collected products so as to maintain in said process water a reduced concentration of said dissolved organic materials in relation to said given, first concentration thereof, subjecting at least a portion of said process water to ultrafiltration treatment, thereby subdividing said process water into a filtrate portion and a concentrate portion, recirculating at least a portion of said concentrate so as to subject it to additional ultrafiltration, thereby raising the concentration of said materials of increased molecular weight, and continuing to expose said dissolved materials in said filtrate to said ultraviolet light and the remainder of said process water to said light until said materials achieve molecular weight sufficient to render said materials separable by ultrafiltration.

2. An improved ultrafiltration method, said method including circulating industrial process water through an ultrafiltration apparatus, adapted to pass process water through a semi-permeable membrane to produce filtrate water and to trap certain materials by means of a semi-permeable membrane to produce a concentrate portion of said process water, having therein an increased concentration of materials retained by said membrane, said process water being characterized by having dissolved therein organic materials of relatively simple structure and sufficiently low molecular weight so as to render said materials not susceptible of removal from said water by said ultrafiltration process, exposing at least part of said filtrate portion of said process water to ultraviolet radiation of such wavelength and intensity as to initiate chemical reactions, including polymerization reactions, among said organic materials, permitting said reactions to continue until said organic materials have increased in complexity and molecular weight sufficiently to be capable of removal from said process water by said ultrafiltration process, and redirecting said filtrate water having said materials of increased complexity and molecular weight through said ultrafiltration apparatus.

3. A method as defined in claim 2 wherein at least a portion of said organic materials comprises biodegradable materials having a measurable biochemical or biological oxygen demand, said method being also effective to reduce the biological oxygen demand from a relatively high initial level to a reduced level as said process continues.

4. A method as defined in claim 2 which includes the step of continuing said exposure of said filtrate water until the concentration of said materials of increased molecular weight is increased in said concentrate portion to a level at which it is desired to dispose of said concentrate.

5. A method as defined in claim 2 wherein said polymerization is carried out by a reaction mechanism which produces free radicals of increasingly complex molecular structure.

6. A method as defined in claim 2 wherein said wavelength is about 2537 Å.

* * * * *